Sept. 13, 1927.  K. KÜPPERS  1,642,585
HOISTING SYSTEM FOR MINES
Filed Jan. 29, 1925
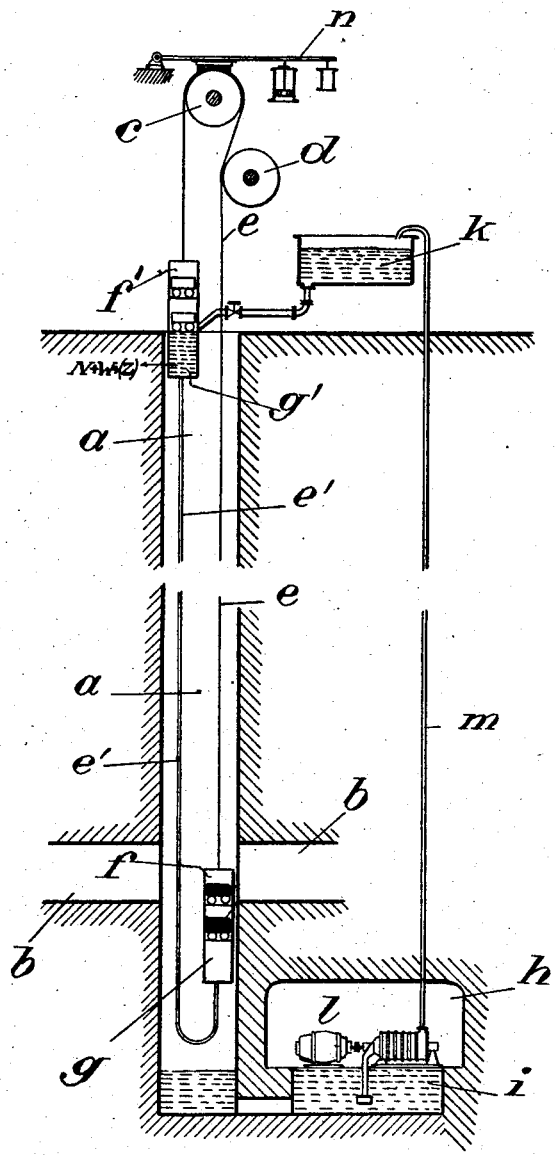

Patented Sept. 13, 1927.

1,642,585

UNITED STATES PATENT OFFICE.

KURT KÜPPERS, OF CASSEL, GERMANY, ASSIGNOR TO KALI-INDUSTRIE A. G., OF CASSEL, GERMANY.

HOISTING SYSTEM FOR MINES.

Application filed January 29, 1925, Serial No. 5,574, and in Germany February 12, 1924.

My invention relates to improvements in hoisting systems for mines, and more particularly in systems of the type in which the power for elevating the cage or other freight carrying member is supplied by water found at the top of the pit, charged into a receptacle connected with the descending cage and discharged at the bottom of the pit. The objects of the improvements are, first, to provide a system of this type in which the water discharged at the bottom of the pit is pumped to the top of the mine for being used over and over again for supplying power for elevating the the cage, second, to provide a system in which the pump for raising the water may be operated at any time independently of the time of the operation of the hoisting machine, so that the power required for operating the system may be stored at any time, for example, at night or at the time when other apparatus connected to the power system are out of operation, third, to provide a system in which the waste steam from the steam engine used for supplying the energy for driving the pump may be used in an economical way for heating and other purposes, fourth, to provide a system which is independent of any trouble occurring in the net or other power supplying plant, and which may even be operated when the steam-boiler, the central power system or the net supplying electric energy to the pump are out of operation, fifth, to provide a system having a high efficiency also in case of reduced work, and in which no power is wasted when the hoisting machine is out of operation and, sixth, to provide a system which can be used in connection with a large mass of work, and in which the accelerating and retarding forces acting on the hoisting machine are controlled so that the cages are rapidly accelerated and gradually retarded for being stopped at the bottom of the pit. With these and other objects in view my invention consists in providing a system comprising two or more cages adapted to be alternately elevated and lowered in the pit and connected by an endless rope suspended from a pulley, a storage tank of large capacity provided at the top of the mine for charging the descending cage with a suitable amount of water as a driving medium, a storage tank provided at the bottom of the pit for discharging the water from the cages into the same, and a pump for forcing the water from the bottom tank to the top tank, the capacity of the said tanks being such that the hoisting machine may be used for a considerable length of time without operating the pump, and the mass of the endless rope secured to the bottoms of the cages being comparatively large so that the gravity of the descending part of the system is at first large and is gradually reduced.

For the purpose of explaining the invention an example embodying the same has been illustrated in the accompanying drawing showing the system in a diagrammatical way.

In the example shown in the figure the mine comprises a pit $a$ and two galleries $b$. Above the pit two pulleys $c$ and $d$ are mounted. The rope $e$ is secured to the tops of cages $f$ and $f'$ and passes over pulley $c$ and in contact with pulley $d$, and the rope $e'$ is secured to the bottoms of the receptacles $g$ and $g'$. The cages $f$ and $f'$ may be constructed in any known or preferred way. The receptacles $g$ and $g'$ are adapted to contain a suitable amount of water. For the purpose of illustration the said receptacles are provided below the bottom of the cages. But I wish it to be understood that my invention is not limited to this feature. It will therefore be observed from the foregoing that each of the cages $f$ and $f'$ with its corresponding receptacle $g$ or $g'$ constitute a load carrying member for the elevating or the lowering of bodies in the mine shaft.

At the bottom of the pit there is a gallery $h$ comprising a pool $i$ of large capacity communicating with the bottom of the pit and adapted to store the water discharged from the descended cages. At the top of the pit and above the ground there is a container $k$ of large capacity adapted to store the water lifted from the pool $i$ by means of a pump $l$ and through a pipe $m$. The capacity of the containers $i$ and $k$ is a multiple of that of the receptacles $g$ and $g'$, so that the hoisting machine can be operated for a considerable length of time say a whole day without lifting water from the pool $i$ to the receptacle $k$.

The pulley $c$ is acted upon by a brake $n$. The rope section $e'$ connected to the bottoms of the receptacles $g$, $g'$ has a comparatively large mass, exceeding that of the rope section $e$, its object being to control the velocity of the movement of the receptacles. With the parts shown in the figure almost the whole mass of the rope acts on the upper cage $f'$, and the rope tends to pull the cage downwardly. As the cages approach the middle of the lift the forces exerted by the rope on the cages are gradually balanced, and after the descending cage has passed the middle the force exerted by the rope on the cages is reversed, so that the rope $e'$ which before had an accelerating action tends to retard the movement of the cages. Preferably the gravity of the rope is such, that it accelerates the system until the cages are substantially at the middle of the lift and that the velocity of the cages is nearly zero when the descending cage is at the bottom of the pit.

The operation of the system is as follows: When the parts are in the position shown in the figure the receptacle $g'$ of the cage $f'$ is filled with water from the container $h$, and the pulley $c$ is released from the brake $n$. Now the left hand cage begins its downward movement by the action of the gravity of the water and the rope $e'$, whereby accelerating movement is imparted to the system. Thereby the length of rope $e'$ suspended from the cage $f'$ is gradually reduced and the length of rope $e'$ acting on the cage $f$ is increased. Therefore the accelerating force acting on the system is reduced. When the cages pass the middle of the lift the acceleration of their movement has been reduced to zero and their velocity is at its maximum. Thereafter the velocity is retarded until the receptacles arrive in their end positions, where the velocity is nearly zero. Preferably the amount of the water filled into the receptacle $g'$ is equal to the weight $N$ of the freight raised from the bottom of the pit, plus a certain amount $W$ for overcoming the resistance of the system and a certain amount $Z$ insuring movement of the cages respectively to the top and bottom of the pit. Ordinarily the cages will arrive in their end positions at a certain velocity, and they are arrested by means of the brake $n$.

After the cages have been arrested the liquid is discharged from the receptacle $g'$ into the pool $i$, whereupon the receptacle $g$ is filled with water from the container $h$ and a new freight is elevated.

The liquid discharged into the container $i$ is raised to the top of the mine by means of the pump $l$. An important feature of the invention resides in the fact that the capacity of the containers $i$ and $h$ is a large multiple of that of the receptacles $g$ and $g'$, so that the hoisting apparatus may be operated for a considerable length of time without exhausting the supply of liquid from the containers, even if the pump is out of operation. Thereby I am enabled to operate the pump only at such periods of time when the consumption of energy by other power consumers is at its minimum, and I can operate the hoisting machine when the electrical or other power plant is out of operation. Generally speaking my improved system is adapted to equalize the consumption of power of the electrical power plant, which is of high economical importance.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. In art of driving hoisting apparatus for mine shafts in which water is used as a counterweight for causing the lowering and raising of cages carried respectively on each branch of a flexible means passing over a pulley, the method which comprises providing a very large water reservoir near the surface of the earth and another such reservoir near the bottom of the mine shaft and raising the water from the reservoir near the bottom of the mine shaft to the reservoir near the surface of the earth at a time when the requirements on the power source are small so that the raising of the water to drive the hoisting apparatus does not load the power source at the moments of peak loads.

2. A hoisting system including in combination two upwardly and downwardly movable load carrying members each provided with a receptacle, flexible means connecting said carrying members for moving them in opposite directions, storage means at the top and at the bottom of the system for supplying liquid to and receiving liquid from the receptacle on any load carrying member, said storage means having a capacity many times the capacity of said receptacle, whereby the hoisting system may be operated for long periods of time without the necessity of the use of external energy.

3. A hoisting system including in combination two upwardly and downwardly movable load carrying members each including a receptacle, flexible means connecting said carrying members for moving them in opposite directions, storage means at the top and at the bottom of the system for supplying liquid to and receiving liquid from the receptacles, and a weighted flexible member connected between and suspended from each of said load carrying members.

In testimony whereof, I have signed my name to this specification at Frankfort a/M, Germany this 8th day of January, 1925.

KURT KÜPPERS.